(12) United States Patent
Maeda et al.

(10) Patent No.: US 8,414,733 B2
(45) Date of Patent: Apr. 9, 2013

(54) PHOTOSENSITIVE RESIN COMPOSITION FOR OPTICAL WAVEGUIDE FORMATION, OPTICAL WAVEGUIDE AND METHOD FOR PRODUCING OPTICAL WAVEGUIDE

(75) Inventors: Katsumi Maeda, Minato-ku (JP); Kaichiro Nakano, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/915,244

(22) Filed: Oct. 29, 2010

(65) Prior Publication Data
US 2011/0044597 A1 Feb. 24, 2011

Related U.S. Application Data

(62) Division of application No. 12/092,679, filed as application No. PCT/JP2006/321855 on Nov. 1, 2006, now Pat. No. 7,847,017.

(30) Foreign Application Priority Data
Nov. 10, 2005 (JP) ................................ 2005-326225

(51) Int. Cl.
*G02B 6/02* (2006.01)
*G03F 7/20* (2006.01)

(52) U.S. Cl.
USPC ............................ 156/325; 385/129; 430/321

(58) Field of Classification Search .................. 156/217, 156/305, 257, 268, 322, 330, 325; 385/132, 385/143, 145, 129; 264/1.27; 430/321
See application file for complete search history.

(56) References Cited

U.S. PATENT DOCUMENTS

| | | | |
|---|---|---|---|
| 4,427,823 A | 1/1984 | Inagaki et al. | |
| 4,624,971 A | 11/1986 | Van Tao et al. | |
| 6,352,813 B2 | 3/2002 | Nakano et al. | |
| 6,521,677 B2* | 2/2003 | Yashiro et al. | ................ 523/212 |
| 7,129,014 B2 | 10/2006 | Toishi et al. | |
| 7,394,965 B2 | 7/2008 | Utaka et al. | |
| 2001/0021482 A1* | 9/2001 | Nakano et al. | ............. 430/280.1 |
| 2002/0045126 A1 | 4/2002 | Watanabe et al. | |

(Continued)

FOREIGN PATENT DOCUMENTS

| | | |
|---|---|---|
| JP | 61-57610 A | 3/1986 |
| JP | 61-85421 A | 5/1986 |

(Continued)

OTHER PUBLICATIONS

Communication dated Oct. 30, 2012 from the Japanese Patent Office in counterpart application No. 2007-544106.

*Primary Examiner* — Katarzyna Wyrozebski Lee
*Assistant Examiner* — Daniel Lee
(74) *Attorney, Agent, or Firm* — Sughrue Mion, PLLC

(57) ABSTRACT

The present invention has an object to provide a photosensitive resin composition for optical waveguide formation, which has low transmission loss and can form a waveguide pattern with high shape accuracy at low cost; an optical waveguide; and a method for producing an optical waveguide. The present invention provides a photosensitive resin composition for optical waveguide formation comprising at least: a polymer containing at least a (meth)acrylate structure unit having an epoxy structure, and a (meth)acrylate structure unit having a lactone structure and/or a vinyl monomer structure unit having an aromatic structure; and a photoacid generator, of which one or both of a core layer and a cladding layer are formed of a cured product.

8 Claims, 1 Drawing Sheet

U.S. PATENT DOCUMENTS

| | | | |
|---|---|---|---|
| 2002/0186935 A1* | 12/2002 | Inui et al. | 385/84 |
| 2003/0004221 A1* | 1/2003 | Sakurai et al. | 522/15 |
| 2003/0232279 A1 | 12/2003 | Choi | |
| 2004/0026803 A1* | 2/2004 | Yatsuda et al. | 264/1.27 |
| 2005/0062801 A1 | 3/2005 | Kato et al. | |

FOREIGN PATENT DOCUMENTS

| | | |
|---|---|---|
| JP | 7-3116 A | 1/1995 |
| JP | 8-271746 A | 10/1996 |
| JP | 9-124793 A | 5/1997 |
| JP | 10-170738 A | 6/1998 |
| JP | 11-5816 A | 1/1999 |
| JP | 11-337752 A | 12/1999 |
| JP | 2001-22075 A | 1/2001 |
| JP | 2001504239 A | 3/2001 |
| JP | 2003-55362 A | 2/2003 |
| JP | 2003147017 A | 5/2003 |
| JP | 2003519819 A | 6/2003 |
| JP | 2003-222999 A | 8/2003 |
| JP | 2004-10534 A | 1/2004 |
| JP | 2004-190008 A | 7/2004 |
| JP | 2004352968 A | 12/2004 |
| JP | 2005-8847 A | 1/2005 |
| JP | 2005-126497 A | 5/2005 |
| JP | 2005-519146 A | 6/2005 |
| JP | 2006-22303 A | 1/2006 |

* cited by examiner

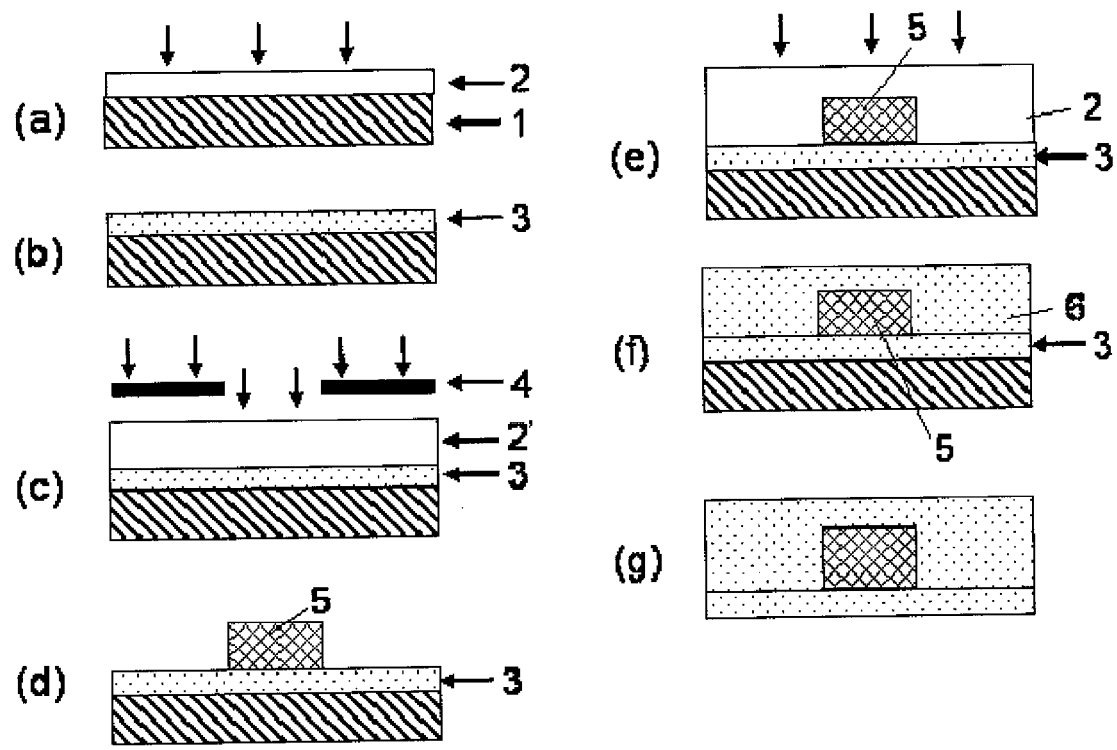

PHOTOSENSITIVE RESIN COMPOSITION FOR OPTICAL WAVEGUIDE FORMATION, OPTICAL WAVEGUIDE AND METHOD FOR PRODUCING OPTICAL WAVEGUIDE

This is a Divisional of application Ser. No. 12/092,679 filed May 5, 2008, claiming priority based on Patent Application No. 2005-326225 filed Nov. 5, 2005 and PCT/JP2006/321855, filed Nov. 1, 2006, the contents of all of which are incorporated herein by reference in their entirety.

TECHNICAL FIELD

The present invention relates to an optical waveguide used for optical elements, optical interconnections, optical wiring boards, and opto-electric hybrid circuit boards etc., which are used in the fields of optical communication, optical information processing and the like, and to a photosensitive resin composition for optical waveguide formation for forming the optical waveguide, and a method for producing the optical waveguide.

BACKGROUND ART

In recent years, internet and digital electric home appliances have rapidly become popular and it has been required for information processing in communication systems and computers to have high capacity and high speed, and therefore it has been investigated that high capacity data is transmitted at a high speed by a high frequency signal. However, when transmitting high-capacity data by a high frequency signal, a conventional transmission system by electric wiring has a high transmission loss, and therefore a transmission system by light has been actively investigated and intended to be used for wirings for communication between computers, and for communication in an apparatus or a board, and the like. An optical waveguide which is one of elements for realizing such transmission systems by light is a basic constitutional element in optical elements, optical interconnections, optical wiring boards, opto-electric hybrid circuit boards, and the like, and therefore the optical waveguide has been required to provide high performance and to be low cost.

A quartz waveguide and a polymer waveguide have been heretofore known as the optical waveguide. Among these, the quartz waveguide has a characteristic of extremely low transmission loss in a range of wavelength of 600 to 1600 nm used in a transmission system by light, but has a demerit from the viewpoint of a production process and cost such as high processing temperature and difficulty in production of a waveguide with a large area.

On the other hand, since the polymer waveguide is formed using a photosensitive resin composition, it has such advantages as providing easy processing and having a high degree of freedom for material design, and therefore those using polymer materials such as PMMA [poly(methyl methacrylate)], epoxy resins, polysiloxane derivatives have been investigated. For example, Patent Documents 1 and 2 each describe a polymer waveguide using an epoxy compound. Further, Patent Document 3 describes a waveguide using a polysiloxane derivative.

However, there has been suggested such a problem that the polymer waveguide generally has low heat resistance and high transmission loss in a range of wavelength of 600 to 1600 nm used in a transmission system by light. In order to solve this problem, there have been investigated, for example, a method for reducing transmission loss by chemical modification such as deuteration and fluorination of the polymer, and a method of using polyimide derivatives such as fluorinated polyimide with heat resistance. However, these methods have disadvantages, for example, that the deuterated PMMA has low heat resistance, and that although fluorinated polyimide is excellent in heat resistance, a dry etching process is necessary for forming a waveguide pattern as well as in the case of the quartz waveguide, and thereby production cost is increased.

Patent Document 1: Japanese Patent Application Laid-Open No. 10-170738

Patent Document 2: Japanese Patent Application Laid-Open No. 11-337752

Patent Document 3: Japanese Patent Application Laid-Open No. 9-124793

DISCLOSURE OF THE INVENTION

Problem to be Solved by the Invention

Accordingly, in order to form a polymer optical waveguide using a photosensitive resin composition, there have been demanded a photosensitive resin composition for optical waveguide formation, which has low transmission loss and can form an optical waveguide pattern with high shape accuracy at low cost; an optical waveguide; and a method for producing an optical waveguide.

Means for Solving the Problem

The present inventors have made studies in order to achieve the above-mentioned object, and as a result, they have found that one or both of a core layer and a cladding layer of an optical waveguide are formed by a photosensitive resin composition containing a (meth)acrylate-based polymer with specific structures and a photoacid generator as constitutional components, and thereby the resulting waveguide has low transmission loss and a waveguide pattern can be formed with high shape accuracy while imparting a suitable refractive index to each of the layers, and thus have completed the present invention.

That is, a photosensitive resin composition for optical waveguide formation of the present invention for achieving the above-mentioned object comprises at least: a polymer containing a repeating structural unit represented by the following general formula (1), and a repeating structural unit represented by the following general formula (2) and/or a structural unit represented by the following general formula (3); and a photoacid generator:

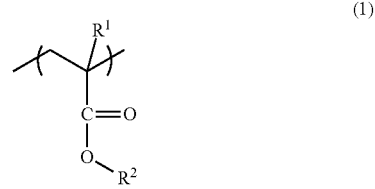

(1)

wherein $R^1$ represents hydrogen atom or methyl group and $R^2$ represents an organic group having an epoxy structure;

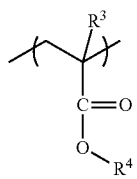

(2)

wherein R³ represents hydrogen atom or methyl group and R⁴ represents an organic group having a lactone structure; and

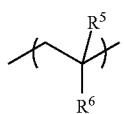

(3)

wherein R⁵ represents hydrogen atom or methyl group and R⁶ represents an organic group having an aromatic structure.

Further, the photosensitive resin composition for optical waveguide formation of the present invention is characterized by further comprising an epoxy compound (except for a polymer containing a repeating structural unit represented by the general formula (1), a repeating structural unit represented by the general formula (2) and/or a repeating structural unit represented by the general formula (3)).

Further, the photosensitive resin composition for optical waveguide formation of the present invention is characterized by further comprising an oxetane compound.

Further, the photosensitive resin composition for optical waveguide formation of the present invention is characterized by further comprising at least one additive selected from the group consisting of alumina, silica, glass, silicone and titanium oxide.

Further, the photosensitive resin composition for optical waveguide formation of the present invention is characterized in that the additive has any one form selected from fiber, bead, liquid and powder.

Further, an optical waveguide of the present invention for achieving the above-mentioned object is an optical waveguide characterized by comprising a core layer and a cladding layer formed on an outer periphery of the core layer, wherein one or both of the core layer and the cladding layer are made of a cured product of the photosensitive resin composition for optical waveguide formation.

Further, a method for producing an optical waveguide of the present invention for achieving the above-mentioned object is a method for producing the above-mentioned optical waveguide which is characterized in that the photosensitive resin composition layer for optical waveguide formation is irradiated with actinic rays and then cured to thereby form one or both of the core layer and the cladding layer.

Further, the method for producing an optical waveguide of the present invention is a method for producing the above-mentioned optical waveguide and characterized by comprising at least:

(1) forming a lower cladding layer constituting a lower portion of the cladding layer on a substrate;
(2) applying the resin composition for optical waveguide formation on the lower cladding layer;
(3) pre-baking the resin composition for optical waveguide formation to form a resin composition layer for optical waveguide formation;
(4) irradiating a region to be a core layer of the resin composition layer for optical waveguide formation with actinic rays through a mask;
(5) performing heating after the exposure;
(6) performing development to remove an unexposed portion of the resin composition layer for optical waveguide formation;
(7) performing post-baking to form a core layer formed of the exposed portion of the resin composition layer for optical waveguide formation; and
(8) forming an upper cladding layer constituting an upper portion of the cladding layer on the lower cladding layer having the core layer formed thereon.

Further, the method for producing the optical waveguide of the present invention is characterized in that, when forming one or both of the lower cladding layer and the upper cladding layer, the resin composition for optical waveguide formation having a lower refractive index than that of the core layer is irradiated with actinic rays and then cured.

Effect of the Invention

Since the photosensitive resin composition for optical waveguide formation of the present invention can form an optical waveguide pattern with high shape accuracy and the formed optical waveguide has excellent transmission properties (low propagation loss), it can be preferably used as a material for optical waveguide formation.

BRIEF DESCRIPTION OF THE DRAWINGS

FIG. 1 is an example showing a process for producing a polymer optical waveguide according to the present invention, and (a) to (g) are schematic cross-sectional views in respective steps.

| (Description of Symbols) | |
|---|---|
| 1 | Substrate |
| 2 | First photosensitive resin composition layer |
| 2' | Second photosensitive resin composition layer |
| 3 | Lower cladding layer |
| 4 | Photomask |
| 5 | Core layer |
| 6 | Upper cladding layer |

BEST MODE FOR CARRYING OUT THE INVENTION

Hereinafter, the photosensitive resin composition for optical waveguide formation, the optical waveguide and the method for producing the optical waveguide of the present invention will be described.

<Photosensitive Resin Composition for Optical Waveguide Formation>

A photosensitive resin composition for optical waveguide formation of the present invention (hereinafter, referred to as a "photosensitive resin composition") comprises at least; a polymer containing a repeating structural unit represented by the following general formula (1), and a structural unit represented by the following general formula (2) and/or a structural unit represented by the following general formula 3; and a photoacid generator, which can usually be prepared by mixing the polymer and the photoacid generator:

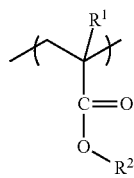  (1)

wherein $R^1$ represents hydrogen atom or methyl group and $R^2$ represents an organic group having an epoxy structure;

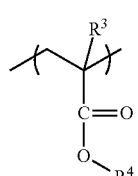  (2)

wherein $R^3$ represents hydrogen atom or methyl group and $R^4$ represents an organic group having a lactone structure; and

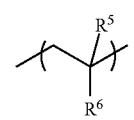  (3)

wherein $R^5$ represents hydrogen atom or methyl group and $R^6$ represents an organic group having an aromatic structure.

In the general formula (1), $R^1$ represents hydrogen atom or methyl group, and $R^2$ represents an organic group having an epoxy structure. $R^2$ is preferably a hydrocarbon group having an epoxy structure. $R^2$ preferably has 3 to 13 carbon atoms, and more preferably has 7 to 10 carbon atoms. Examples of the organic group $R^2$ having an epoxy group include glycidyl group, 3,4-epoxy-1-cyclohexylmethyl group, 5,6-epoxy-2-bicyclo[2,2,1]heptyl group, 5-epoxyethyl-2-bicyclo[2,2,1]heptyl group, 6-epoxyethyl-2-bicyclo[2,2,1]heptyl group, 5,6-epoxy-2-bicyclo[2,2,1]heptylmethyl group, 3,4-epoxytricyclo[5.2.1.0$^{2,6}$]decyl group, 3,4-epoxytricyclo[5.2.1.0$^{2,6}$]decyloxyethyl group, 3,4-epoxytetracyclo[4.4.0.1$^{2,5}$.1$^{7,10}$]dodecyl group and 3,4-epoxytetracyclo[4.4.0.1$^{2,5}$.1$^{7,10}$]dodecylmethyl group.

In the general formula (2), $R^3$ represents hydrogen atom or methyl group, and $R^4$ represents an organic group having a lactone structure. $R^4$ is preferably a hydrocarbon group having a lactone structure. $R^4$ preferably has 4 to 13 carbon atoms, and more preferably has 7 to 10 carbon atoms. Examples of the repeating structural unit represented by the general formula (2) include those as follows, but are not intended to be limited to them.

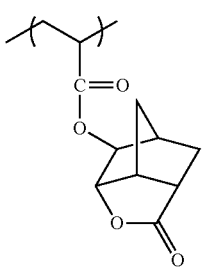

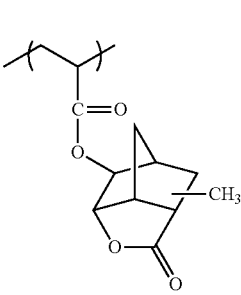
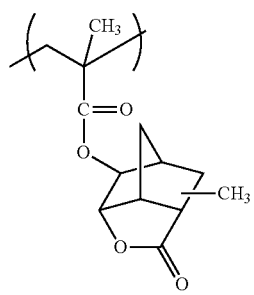

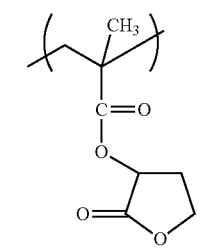
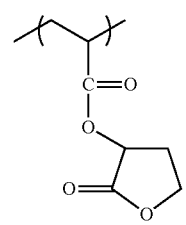

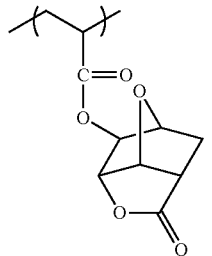
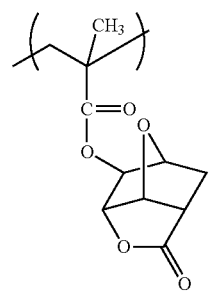

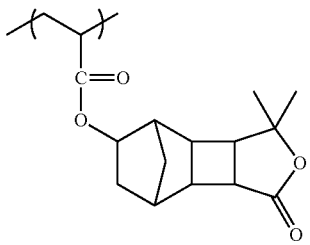

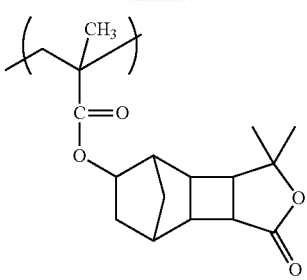

In the general formula (3), $R^5$ represents hydrogen atom or methyl group, and $R^6$ represents an organic group having an aromatic structure. The term of "aromatic structure" refers to a structure having at least one benzene ring. $R^6$ preferably has 6 to 15 carbon atoms, and more preferably has 6 to 10 carbon atoms. Examples of the repeating structural unit represented by the general formula (3) include those as follows, but are not intended to be limited to them.

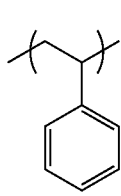
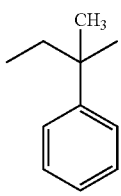
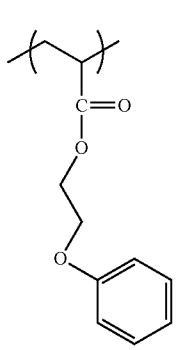

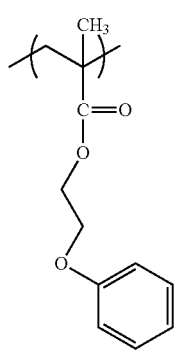
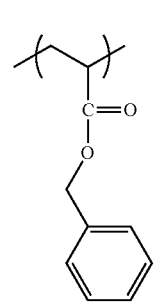
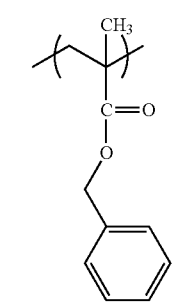

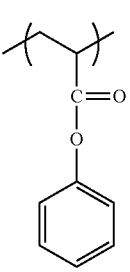
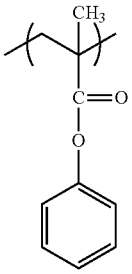
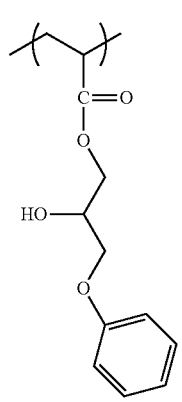

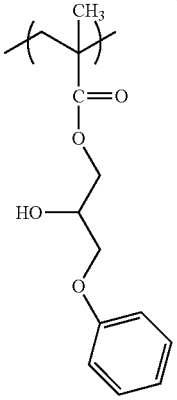
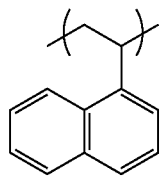

In order to obtain the polymer having a repeating structural unit represented by the general formula (1), and a repeating structural unit represented by the general formula (2) and/or a structural unit represented by the general formula (3), vinyl monomers corresponding to the respective units may be used as raw monomer materials and subjected to polymerization by a known polymerization method, for example, solution polymerization, suspension polymerization or bulk polymerization. After polymerization, the resulting polymer is desirably purified by a known purification method to remove unreacted monomers, a polymerization initiator and the like.

In the case of a polymer having a structural unit of the general formula (1) and a structural unit of the general formula (2), but having no repeating structural unit represented by the general formula (3), a ratio of the structural unit of the general formula (1) and the structural unit of the general formula (2) is not intended to be particularly limited, but is preferably in a range of 90:10 to 10:90 by a ratio of the number of each unit.

Further, in the case of a polymer having a structural unit of the general formula (1) and a structural unit of the general formula (3), but having no repeating structural unit represented by the general formula (2), a ratio of the structural unit of the general formula (1) and the structural unit of the general formula (3) is not intended to be particularly limited, but is preferably in a range of 90:10 to 10:90 by a ratio of the number of each unit.

Further, in the case of a polymer having a structural unit of the general formula (1), a structural unit of the general formula (3) and a repeating structural unit represented by the general formula (2), a ratio of the structural unit (x) of the general formula (1), the structural unit (y) of the general formula (2) and the structural unit (z) of the general formula (3) is not intended to be particularly limited, but is preferably in a range of $x+y+z=100$, $10 \leq y \leq 80$ and $10 \leq z \leq 80$ by the number of each unit.

A polymer used in the present invention can further contain a structural unit other than those of the above-mentioned general formulae (1), (2) and (3). Examples thereof include a structural unit derived from vinyl monomers such as (meth)acrylic acid and (meth)acrylic acid alkyl ester. The structural unit other than those of the general formulae (1), (2) and (3), which is contained in a polymer, is preferably 50 mol % or less based on the total of structural units in the polymer.

Further, the above-mentioned polymer has a weight average molecular weight (Mw) of preferably 1,000 or more, and more preferably 4,000 or more. In addition, The Mw is preferably 1,000,000 or less, and more preferably 500,000 or less.

Further, the photosensitive resin composition of the present invention may further contain an epoxy compound. It is to be noted that examples of this epoxy compound do not include the above-mentioned polymer (the polymer having a repeating structural unit represented by the general formula (1), and a repeating structural unit represented by the general formula (2) and/or a repeating structural unit represented by the general formula (3)). The epoxy compound preferably has 6 to 24 carbon atoms. Examples of the epoxy compound include bisphenol A diglycidyl ether, hydrogenated bisphenol A diglycidyl ether, ethylene glycol diglycidyl ether, diethylene glycol diglycidyl ether, propylene glycol diglycidyl ether, tripropylene glycol diglycidyl ether, neopentyl glycol diglycidyl ether, 1,6-hexanediol diglycidyl ether, glycerol diglycidyl ether, trimethyrol propane triglycidyl ether, 1,2-cyclohexanecarboxylic acid diglycidyl ester, 3,4-epoxycyclohexanecarboxylic acid 3,4-epoxycyclohexylmethyl, tris(epoxypropyl) isocyanurate, 2-epoxyethylbicyclo[2,2,1]heptyl glycidyl ether, ethylene glycol bis(2-epoxyethylbicyclo[2,2,1]heptyl) ether, and bis(2-epoxyethylbicyclo[2,2,1]heptyl)ether. Among these, hydrogenated bisphenol A diglycidyl ether is preferred. The epoxy compound may be used singly or two or more of them may be mixed for use.

Further, when these epoxy compounds are added to the photosensitive resin composition, the content is usually 0.5 to 80% by mass, preferably 1 to 70% by mass based on the total of all constitutional components contained in the photosensitive resin composition.

Further, the photosensitive resin composition of the present invention may further contain an oxetane compound. The oxetane compound preferably has 6 to 20 carbon atoms. Examples of the oxetane compound include 3-ethyl-3-hydroxylmethyloxetane, 1,4-bis{[(3-ethyl-3-oxetanyl)methoxy]methyl}benzene, 3-ethyl-3-(phenoxymethyl)oxetane, di[1-ethyl(3-oxetanyl)]methyl ether, 3-ethyl-3-(2-ethylhexyloxymethyl)oxetane, and 3-ethyl-3-{[3-(triethoxysilyl)propoxy]methyl}oxetane. Among these, 1,4-bis{[(3-ethyl-3-oxetanyl)methoxy]methyl}benzene is preferred. The oxetane compound may be used singly or two or more of them may be mixed for use.

Further, when these oxetane compounds are added to the photosensitive resin composition, the content is usually 0.5 to 80% by mass, preferably 1 to 70% by mass based on the total of all constitutional components contained in the photosensitive resin composition.

Further, the photoacid generator used for the present invention is desirably a photoacid generator for generating an acid by light used for exposure, and is not particularly limited as long as a uniform coating film can be formed using a solution containing the photosensitive resin composition of the present invention dissolved in a solvent by a film forming method such as spin coating.

Examples of the usable photoacid generator include, but are not limited to, triarylsulfonium salt derivatives, diaryliodonium salt derivatives, dialkylphenacyl sulfonium salt derivatives, nitrobenzyl sulfonate derivatives, sulfonic acid esters of N-hydroxynaphtalimide, and sulfonic acid ester derivatives of N-hydroxysuccineimide. Among these, the triarylsulfonium salt derivatives are preferred. Examples of the triarylsulfonium salt derivative include 4-thiophenoxyphenyl diphenylsulfonium hexafuluoroantimonate, and 4-thiophenoxyphenyl diphenylsulfonium hexafluorophosphate. The photoacid generator may be used singly or two or more of them may be mixed for use.

A content of the photoacid generator is preferably 0.05% by mass or more, more preferably 0.1% by mass or more based on the total of the polymer, the epoxy compound and the oxetane compound and the photoacid generator, from the viewpoint of realizing sufficient sensitivity of the photosensitive resin composition and enabling good pattern formation. On the other hand, the content of the photoacid generator is preferably 15% by mass or less, more preferably 7% by mass or less based on the total of the polymer, the epoxy compound and the oxetane compound and the photoacid generator, from the viewpoint of realizing uniform coating film formation and not impairing properties of the waveguide.

Further, various additives may be appropriately added to the photosensitive resin composition of the present invention within an extent not impairing properties as an optical waveguide. Examples of such additive include alumina, silica, glass, silicone and titanium oxide. Addition of these additives can improve cracking resistance and heat resistance, intend to provide low elastic modulus and improve warpage of the waveguide. Another component such as an adhesion improver and a coating modifier can be further added, if necessary. The additive may have any one form selected from fiber, bead, liquid and powder.

Further, when the above-mentioned photosensitive resin composition is prepared, an appropriate solvent can be used, if necessary. A type and an amount of the solvent used are not particularly limited as long as the photosensitive resin composition can be thoroughly dissolved in the solvent and the resulting solution can be uniformly applied by a spin coating method or the like. Specifically, organic solvents such as γ-butyrolactone, propyleneglycol monomethyl ether acetate, propyleneglycol monoethyl ether acetate, ethyl lactate, 2-heptanone, 2-methoxybutyl acetate, 2-ethoxyethyl acetate, methyl pyruvate, ethyl pyruvate, methyl 3-methoxypropionate, ethyl 3-methoxypropionate, N-methyl-2-pyrolidone, cyclohexanone, cyclopentanone, methylisobutylketone, ethyleneglycol monomethyl ether, ethyleneglycol monomethyl ether acetate, ethyleneglycol monoethyl ether, ethyleneglycol monoisopropyl ether, diethyleneglycol monomethyl ether and diethyleneglycol dimethyl ether can be used. These organic solvents may be used singly or two or more of them may be mixed for use. An amount of the solvent used can be, for example, 25 to 200 parts by mass based on 100 parts by mass of the photosensitive resin composition.

The photosensitive resin composition of the present invention is exposed to light, and thereby a photoacid generator contained in the composition generates an acid. This acid promotes a crosslinking reaction to thereby insolubilize an exposed portion of the composition in a developer. Thus, thereafter, the photosensitive resin composition is subjected to a developing process, and thereby only an unexposed portion of the composition can be selectively removed. Accordingly, the photosensitive resin composition, which has low transmission loss and can form a waveguide pattern with high shape accuracy at low cost, is provided.

<Optical Waveguide>

The optical waveguide of the present invention is an optical waveguide characterized by comprising a core layer and a cladding layer formed on an outer periphery of the core layer, wherein one or both of the core layer and the cladding layer are made of a cured product of the photosensitive resin composition for optical waveguide formation of the present invention. Generally, an optical waveguide consists of a core layer having a relatively high refractive index and a cladding layer having a relatively low refractive index, and is formed in a configuration in which the core layer is surrounded by the cladding layer. That is, photosensitive resin compositions for forming the core layer and the cladding layer are each selected so as to satisfy this requirement. In practice, some cured products of photosensitive resin compositions are actually prepared and refractive indexes of the cured products were measured, and based on the results, photosensitive resin compositions for forming the core layer and the cladding layer are each to be selected. It is to be noted that a cured product obtained from a photosensitive resin composition having more aromatic rings generally tends to have a high refractive index.

As described above, the photosensitive resin composition for optical waveguide formation of the present invention has low transmission loss and can form a waveguide pattern with high shape accuracy at low cost, and therefore one or both of the core layer and the cladding layer are formed of the cured product to thereby provide an optical waveguide having high shape accuracy and excellent transmission properties (low propagation loss). The core layer is preferably formed at least of the cured product of the photosensitive resin composition for optical waveguide formation of the present invention and both of the core layer and the cladding layer are more preferably formed of the cured product.

Further, when selecting each of photosensitive resin compositions for forming the core layer and the cladding layer, a sample, in which a cured product layer of a photosensitive resin composition is formed on a substrate, is fabricated. Then, it can be determined, from a value of refractive index of the sample at a predetermined wavelength, whether the sample is used as either the photosensitive resin composition for forming the core layer or for forming the cladding layer.

A method for producing the optical waveguide of the present invention (a method for forming an optical waveguide pattern) is not particularly limited, but can be performed, for example, by the following method.

<Method for Producing Optical Waveguide>

In the method for producing the optical waveguide of the present invention, the above-mentioned resin composition layer for optical waveguide formation is irradiated with actinic rays and then cured to thereby form one or both of the core layer and the cladding layer. Particularly preferable method comprises at least:

(1) forming a lower cladding layer constituting a lower portion of the cladding layer on a substrate;
(2) applying the resin composition for optical waveguide formation on the lower cladding layer;
(3) pre-baking the resin composition for optical waveguide formation to form a resin composition layer for optical waveguide formation;
(4) irradiating a region to be a core layer of the resin composition layer for optical waveguide formation with actinic rays through a mask;
(5) performing heating after the exposure;
(6) performing development to remove an unexposed portion of the resin composition layer for optical waveguide formation;
(7) performing post-baking to form a core layer formed of the exposed portion of the resin composition layer for optical waveguide formation; and
(8) forming an upper cladding layer constituting an upper portion of the cladding layer on the lower cladding layer having the core layer formed thereon. Further, the above-mentioned resin composition layer for optical waveguide formation can also be irradiated with actinic rays and then cured to thereby form one or both of the lower cladding layer and the upper cladding layer, but in this case, a resin composition layer for optical waveguide formation having a refractive index lower than that of the core layer is selected for use.

Hereinafter, a method for producing the polymer optical waveguide according to the present invention will be described in detail with reference to FIG. 1.

Firstly, a lower cladding layer 3 is formed on a substrate 1. For example, as shown in FIG. 1(a), a solution of the photosensitive resin composition of the present invention is applied to the substrate 1 and pre-baked to thereby form a first photosensitive resin composition layer 2. Next, the first photosensitive resin composition layer 2 is cured and simultaneously made to have a low refractive index by exposing an entire surface thereof by actinic rays and performing heat treatment (baking) process (further a post-baking process, if necessary), so that the first photosensitive resin composition layer 2 is formed as a lower cladding layer 3 (FIG. 1(b)). The lower cladding layer 3 may be one obtained by which other any photosensitive resin composition having an equivalent refractive index is used and subjected to actinic ray or heat treatment.

Examples of the substrate 1 usable in the present invention include, but are not limited to, silicone substrates, glass substrates, quartz substrates, glass epoxy substrates, metal substrates, ceramic substrates, polymer films, and various substrates each having a polymer film formed thereon.

The method for applying the photosensitive resin composition is not particularly limited and for example, spin coating using a spin coater, spray coating using a spray coater, immersing, printing and roll coating can be used. In addition, the pre-baking process is a process in which the applied solution of the photosensitive resin composition is dried to remove a solvent and the applied photosensitive resin composition is made to fix as the first photosensitive resin composition layer 2. The pre-baking process is usually performed at 60 to 160° C. As actinic rays used for the entire surface exposure, ultraviolet rays, visible rays, excimer lasers, electron rays, X-rays and the like can be used, but actinic rays having a wavelength of 180 to 500 nm are preferred. The heat treatment process after the exposure is usually performed at 100 to 160° C. in air or under an inert gas atmosphere. The post-baking process is usually performed at 100 to 200° C. in air or under an inert gas atmosphere. The post-baking process may be performed at one step or a multi-step.

Next, as shown in FIG. 1(c), for example, a solution of the photosensitive resin composition of the present invention is applied to the lower cladding layer 3 and pre-baked to thereby form a second photosensitive resin composition layer 2'. For formation of the second photosensitive resin composition layer 2', a photosensitive resin composition having a refractive index higher than that of the lower cladding layer 3 is selected for use. Here, when the lower cladding layer 3 is formed of the photosensitive resin composition of the present invention, the second photosensitive resin composition layer 2' may be one obtained by using other any photosensitive resin composition having an equivalent refractive index and actinic ray or heat treatment.

The method for applying a photosensitive resin composition is not particularly limited, and for example, spin coating using a spin coater, spray coating using a spray coater, immersing, printing and roll coating can be used. In addition, the pre-baking process is a process in which the applied solution of the photosensitive resin composition is dried to remove a solvent and the applied photosensitive resin composition is made to fix as the second photosensitive resin composition layer 2'. The pre-baking process is usually performed at 60 to 160° C.

Successively, as shown in FIG. 1(c), a region to be a core layer 5 of the photosensitive resin composition layer 2' is irradiated with actinic rays through a photomask 4 (pattern exposure). After the exposure, the photosensitive resin composition layer is further subjected to heat treatment, and then developed by an organic solvent to remove an unexposed portion thereof, and thereafter, further post-baked, so that a core layer 5 having a high refractive index is formed on the lower cladding layer 3, as shown in FIG. 1(d).

The pattern exposure process is a process in which a predetermined region of the photosensitive resin composition layer 2' is selectively exposed to light through the photomask 4 to thereby transfer a waveguide pattern on the photomask 4 into the photosensitive resin composition layer 2'. As actinic rays used for the pattern exposure, ultraviolet rays, visible rays, excimer lasers, electron rays, X-rays and the like can be used, but actinic rays having a wavelength of 180 to 500 nm are preferred. The heat treatment process after the exposure usually performed at 100 to 160° C. in air or under an inert gas atmosphere.

Further, the developing process is a process in which an unexposed portion of the photosensitive resin composition layer 2' is dissolved with an organic solvent and removed to thereby form a pattern to be the core layer 5. The difference in solubility (solubility contrast) of the exposed portion and the unexposed portion of the photosensitive resin composition layer 2' in a developer is generated by the above-mentioned pattern exposure and heating process after the exposure. The pattern to be the core layer 5 in which the unexposed portion of the photosensitive resin composition is dissolved and removed is obtained by utilizing this solubility contrast.

As the organic solvent used for development, specifically, γ-butyrolactone, propyleneglycol monomethyl ether acetate, propyleneglycol monoethyl ether acetate, ethyl lactate, 2-heptanone, 2-methoxybutyl acetate, 2-ethoxyethyl acetate, methyl pyruvate, ethyl pyruvate, methyl 3-methoxypropionate, ethyl 3-methoxypropionate, N-methyl-2-pyrolidone, cyclohexanone, cyclopentanone, methylisobutylketone, ethyleneglycol monomethyl ether, ethyleneglycol monomethyl ether acetate, ethyleneglycol monoethyl ether, ethyleneglycol monoisopropyl ether, diethyleneglycol monomethyl ether, diethyleneglycol dimethyl ether, and the like can be used. These organic solvents may be used singly or two or more of them may be mixed for use. As the developing method, a method such as paddle, immersing or spray development is possible. After developing process, the formed pattern is rinsed with water, the organic solvent used in development or the like.

Further, the post-baking process is usually performed at 100 to 200° C. in air or under an inert gas atmosphere. In addition, the post-baking process may be performed at one step or a multi-step.

Furthermore, as shown in FIG. 1(e), the solution of the photosensitive resin composition used for forming the lower cladding layer 3 is applied to the lower cladding layer 3 having the core layer 5 formed thereon. Then, as shown in FIG. 1(f), an upper cladding layer 6 is formed by performing pre-baking, exposure to the entire surface by actinic rays and heat treatment in the same manner as formation of the lower cladding layer. The upper cladding layer 6 may be one obtained by using other any photosensitive resin composition having a refractive index equivalent to that of the lower cladding layer 3 and ultraviolet ray or heat treatment.

In this way, a polymer optical waveguide formed by surrounding the core layer 5 having a high refractive index by the lower cladding layer 3 and the upper cladding layer 6, each having a low refractive index, can be fabricated. Thereafter, as shown in FIG. 1(g), a polymer optical waveguide can be obtained by further removing the substrate 1 by a method such as etching. In addition, if a flexible polymer film or the like is adopted as the substrate 1, a flexible polymer optical waveguide can be obtained.

As described above, since the photosensitive resin composition of the present invention can form an optical waveguide pattern with high shape accuracy and the formed optical waveguide has excellent transmission properties (low propagation loss), it can be preferably used as a material for optical waveguide formation.

EXAMPLES

Hereinafter, the present invention will be further specifically described by means of Examples. It is to be noted that a molar ratio of each of structural units in the following Synthesis Examples was estimated by $^1$H-NMR analysis of the obtained polymer.

Synthesis Example 1

A polymer having the following structure, that is, a polymer which contains 50 mol % of the structural unit in which $R^1$ is hydrogen atom and $R^2$ is 3,4-epoxytricyclodecyloxyethyl group in the general formula (1) and 50 mol % of the structural unit in which $R^3$ is hydrogen atom and $R^4$ is a 2,6-norbornanecarbolactone-5-yl group in the general formula (2), was synthesized.

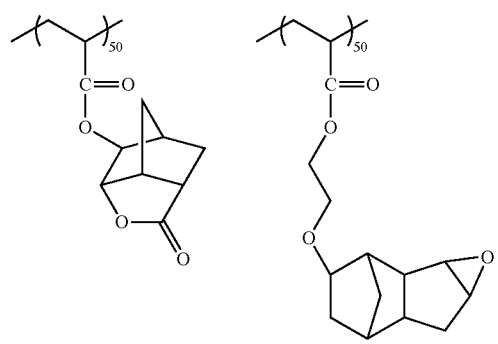

14 g of 5-acryloyl-2,6-norbornanecarbolactone and 17.77 g of 3,4-epoxytricyclodecyloxyethyl acrylate were dissolved in 180 ml of THF, and 1.104 g of 2,2'-azobis(isobutyronitrile) was added to the solution. The resultant mixture was heated to reflux under argon atmosphere for 1 hour. After being left to cool, the mixture was reprecipitated with 1.5 L of methanol, and the precipitated polymer was filtered off. Again, the filtrate was reprecipitated for purification to obtain 27.32 g of the target polymer (yield: 86%). In addition, the polymer was determined to have a weight average molecular weight (Mw) of 16,800 (in terms of polystyrene) and a dispersion degree (Mw/Mn) of 3.22 by GPC analysis.

Synthesis Example 2

A polymer having the following structure, that is, a polymer containing 30 mol % of a structural unit in which $R^1$ is hydrogen atom and $R^2$ is 3,4-epoxytricyclodecyloxyethyl group in the general formula (1), 40 mol % of a structural unit in which $R^3$ is hydrogen atom and $R^4$ is 2,6-norbornanecarbolactone-5-yl group in the general formula (2) and 30 mol % of a structural unit in which $R^5$ is hydrogen atom and $R^6$ is phenoxyethoxycarbonyl group in the general formula (3), was synthesized.

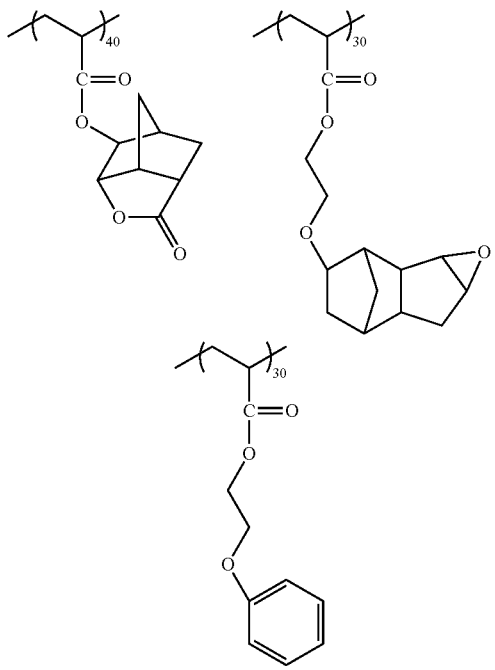

15.754 g of 5-acryloyl-2,6-norbornanecarbolactone, 15 g of 3,4-epoxytricyclodecyloxyethyl acrylate and 10.908 g of phenoxyethyl acrylate were dissolved in 203 ml of THF, and 1.553 g of 2,2'-azobis(isobutyronitrile) was added to the solution. The resultant mixture was heated to reflux under argon atmosphere for 1 hour. After being left to cool, the mixture was reprecipitated with 1,500 ml of diethyl ether, and the precipitated polymer was filtered off. Again, the filtrate was reprecipitated for purification to obtain 34.99 g of the target polymer (yield: 84%). In addition, the polymer was determined to have a weight average molecular weight (Mw) of 21,500 (in terms of polystyrene) and a dispersion degree (Mw/Mn) of 3.44 by GPC analysis.

Synthesis Example 3

A polymer having the following structure, that is, a polymer containing 50 mol % of a structural unit in which $R^1$ is hydrogen atom and $R^2$ is 3,4-epoxytricyclodecyl group in the general formula (1) and 50 mol % of a structural unit in which $R^5$ is hydrogen atom and $R^6$ is phenoxyethoxycarbonyl group in the general formula (3), was synthesized.

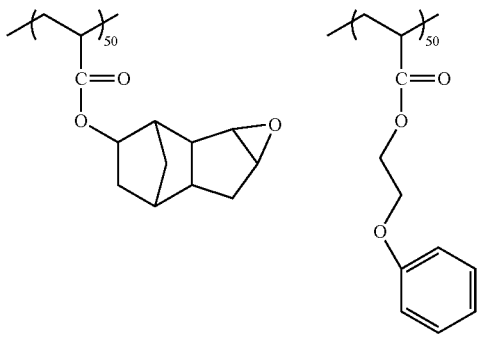

25 g of 3,4-epoxytricyclodecyl acrylate and 21.82 g of phenoxyethyl acrylate were dissolved in 140 ml of THF, and 1.118 g of 2,2'-azobis(isobutyronitrile) was added to the solution. The resultant mixture was heated to reflux under argon atmosphere for 2 hour. After being left to cool, the mixture was reprecipitated with 1,500 ml of hexane, and the precipitated polymer was filtered off. Again, the filtrate was reprecipitated for purification to obtain 40.3 g of the target polymer (yield: 86%). In addition, the polymer was determined to have a weight average molecular weight (Mw) of 9,300 (in terms of polystyrene) and a dispersion degree (Mw/Mn) of 226 by GPC analysis.

Example 1

Photosensitive resin composition solutions (1) to (4), each having the composition shown below, were prepared:
Photosensitive resin composition solution (1):
(a) polymer: polymer obtained in Synthesis Example 1 1.2 g,
(b) epoxy compound: hydrogenated bisphenol A diglycidyl ether 1.2 g,
(c) photoacid generator: 4-thiophenoxyphenyl diphenylsulfonium hexafuluoroantimonate 0.024 g, and
(d) solvent: γ-butyrolactone 4.27 g;
Photosensitive resin composition solution (2):
(a) polymer: polymer obtained in Synthesis Example 2 2 g,
(b) oxetane compound: 1,4-bis{[(3-ethyl-3-oxetanyl)methoxy]methyl}benzene (produced by TOAGOSEI CO., LTD., product number: XDO) 0.6 g,
(c) photoacid generator: 4-thiophenoxyphenyl diphenylsulfonium hexafuluoroantimonate 0.026 g, and
(d) solvent: γ-butyrolactone 4.62 g;
Photosensitive resin composition solution (3):
(a) polymer: polymer obtained in Synthesis Example 3 2 g,
(b) epoxy compound: hydrogenated bisphenol A diglycidyl ether 0.6 g,
(c) photoacid generator: 4-thiophenoxyphenyl diphenylsulfonium hexafuluoroantimonate 0.052 g, and
(d) solvent: γ-butyrolactone 6.07 g; and
Photosensitive resin composition solution (4):
(a) polymer: polymer obtained in Synthesis Example 3 2 g,
(b) oxetane compound: 1,4-bis{[(3-ethyl-3-oxetanyl)methoxy]methyl}benzene (produced by TOAGOSEI CO., LTD., product number: XDO) 0.6 g,
(c) photoacid generator: 4-thiophenoxyphenyl diphenylsulfonium hexafuluoroantimonate 0.052 g, and
(d) solvent: γ-butyrolactone 6.07 g.

The above-mentioned mixtures were each filtered with a 0.45 μm Teflon (registered trademark) filter to prepare the photosensitive resin compositions.

The above-mentioned photosensitive resin composition solutions were each applied to a 4-inch silicon substrate by spin coating, and the coated substrate was then pre-baked in an oven at 90° C. for 20 minutes to form a coating film. Next, an entire surface of the resulting substrate was exposed to ultraviolet rays (wavelength λ=350 to 450 nm) and then subjected to heat treatment at 100° C. for 10 minutes, and thereafter, further post-baked at 120° C. for 30 minutes.

Successively, the refractive index of each sample at 633 nm was measured using a prism coupler manufactured by Metricon Corporation. As a result, the film obtained by applying the photosensitive resin composition solution (1) had a refractive index of 1.5153; the film obtained by applying the photosensitive resin composition solution (2) had a refractive index of 1.5322; the film obtained by applying the photosensitive resin composition solution (3) had a refractive index of 1.5385; and the film obtained by applying the photosensitive resin composition solution (4) had a refractive index of 1.5429.

Example 2

The clad-forming photosensitive resin composition solution, having a composition shown below, was prepared:
(a) polymer: polymer obtained in Synthesis Example 1 12 g,
(b) epoxy compound: hydrogenated bisphenol A diglycidyl ether 12 g,
(c) photoacid generator: 4-thiophenoxyphenyl diphenylsulfonium hexafuluoroantimonate 0.24 g, and
(d) solvent: γ-butyrolactone 29.33 g.

Further, core-forming photosensitive resin composition solutions (5) to (6), each having the composition shown below, were prepared:

Core-forming photosensitive resin composition solution (5):
(a) polymer: polymer obtained in Synthesis Example 2 20 g,
(b) oxetane compound: 1,4-bis{[(3-ethyl-3-oxetanyl) methoxy]methyl}benzene (produced by TOAGOSEI CO., LTD., product number: XDO) 6 g,
(c) photoacid generator: 4-thiophenoxyphenyl diphenylsulfonium hexafuluoroantimonate 0.26 g, and
(d) solvent: γ-butyrolactone 21.27 g; and Core-forming photosensitive resin composition solution (6):
(a) polymer: polymer obtained in Synthesis Example 3 20 g,
(b) epoxy compound: hydrogenated bisphenol A diglycidyl ether 6 g,
(c) photoacid generator: 4-thiophenoxyphenyl diphenylsulfonium hexafuluoroantimonate 0.52 g, and
(d) solvent: γ-butyrolactone 21.27 g.

The above-mentioned mixtures were each filtered with a 0.45 μm Teflon (Registered trademark) filter to prepare the photosensitive resin composition solution.

Next, the above-mentioned clad-forming photosensitive resin composition solution was applied to a 4-inch silicon substrate by spin coating, and the coated substrate was then pre-baked in an oven at 90° C. for 20 minutes to form a film with a thickness of 20 μm. Thereafter, an entire surface of the resulting substrate was exposed to ultraviolet rays (wavelength λ=350 to 450 nm) at 1,000 mJ/cm², and baked in an oven at 100° C. for 10 minutes after the exposure, and further post-baked at 120° C. for 30 minutes to form a lower cladding layer.

Successively, the above-mentioned core-forming photosensitive resin composition solution (5) was applied to the lower cladding layer by spin coating, and the coated substrate was pre-baked in an oven at 90° C. for 30 minutes to form a film with a thickness of 50 μm. Thereafter, the resulting substrate was exposed to ultraviolet rays (wavelength λ=350 to 450 nm) at 1,000 mJ/cm² through a photomask, and then baked in an oven at 100° C. for 10 minutes. Then, the obtained substrate was developed in γ-butyrolactone for 5 minutes by immersion method, and subsequently was subjected to rinse treatment with pure water for 2 minutes. As a result, only an unexposed portion of the photosensitive resin film was dissolved in a developer and removed to thereby obtain a core pattern. Next, the resulting substrate was baked at 120° C. for 30 minutes to completely cure to form a core layer.

Next, the above-mentioned clad-forming photosensitive resin composition solution was applied to the lower cladding layer having the core layer formed thereon by spin coating, and the coated substrate was then pre-baked in an oven at 90° C. for 20 minutes to form a film with a thickness of 20 μm. Thereafter, an entire surface of the resulting substrate was exposed to ultraviolet rays (wavelength λ=350 to 450 nm) at 1,000 mJ/cm², and baked in an oven at 100° C. for 10 minutes after the exposure, and further post-baked at 120° C. for 30 minutes to thereby form an upper cladding layer, so that a polymer waveguide was obtained.

A polymer waveguide was formed in the same manner as the above, using the core-forming photosensitive resin composition solution (6) in place of the core-forming photosensitive resin composition solution (5).

After an end surface of each of these optical waveguides was diced with a dicer, propagation loss evaluation of each optical waveguide was conducted at a wavelength of 850 nm using a cut-back method. As a result, the waveguide using the core-forming photosensitive resin composition solution (5) had a propagation loss of 0.45 dB/cm, and the waveguide using the core-forming photosensitive resin composition solution (6) had a propagation loss of 0.35 dB/cm. In addition, the cladding layers each had a cross-section of rectangular shape.

INDUSTRIAL APPLICABILITY

Since the photosensitive resin composition for optical waveguide formation of the present invention is used to form an optical waveguide pattern with high shape accuracy and the formed optical waveguide has excellent transmission properties (low propagation loss), it is suitable as a material for optical waveguide formation.

The invention claimed is:

1. An optical waveguide comprising:
a core layer and a cladding layer formed on an outer periphery of the core layer, wherein one or both of the core layer and the cladding layer are made of a cured product of a photosensitive resin composition for optical waveguide formation comprising at least:
a polymer containing a first repeating structural unit represented by the following general formula (1), and at least one of a second repeating structural unit selected from the group consisting of units represented by the formulae (4)-(15) and a third repeating structural unit selected from the group consisting of units represented by the formulae (16)-(27); and a photoacid generator:

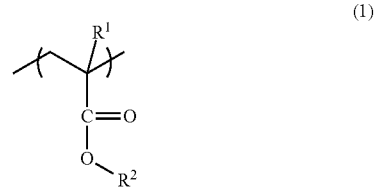

wherein $R^1$ represents hydrogen atom or methyl group and $R^2$ represents an organic group having an epoxy structure;

(4) 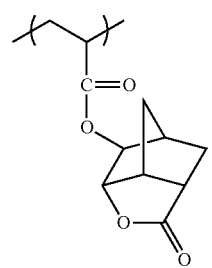
(5) 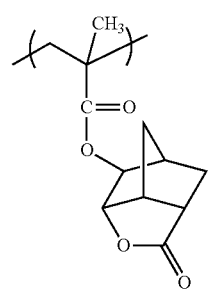
(6) 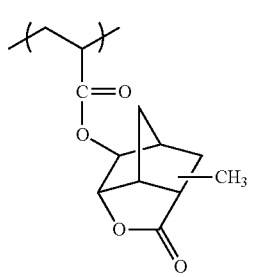
(7) 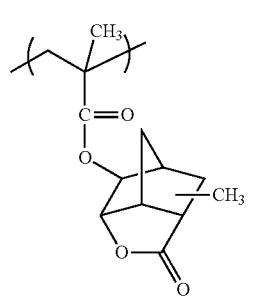
(8) 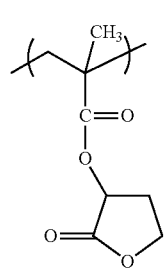
(9) 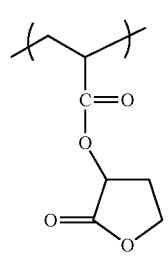
(10) 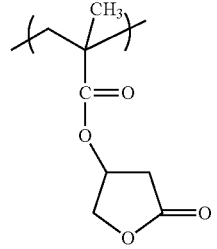
(11) 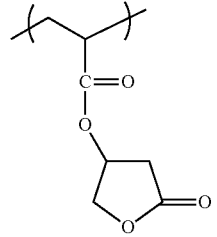
(12) 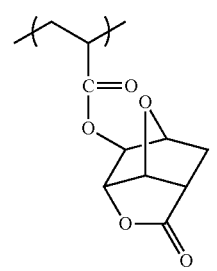
(13) 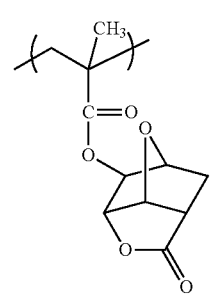
(14) 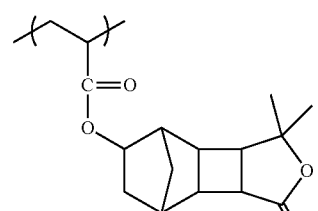
(15) 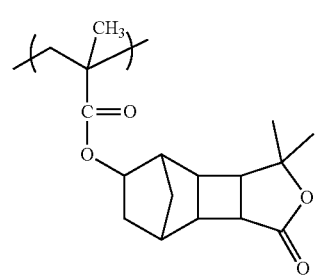

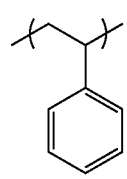(16)
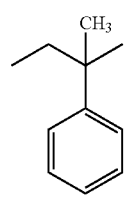(17)
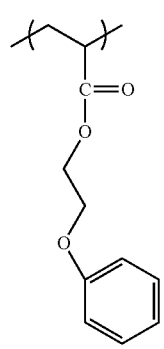(18)
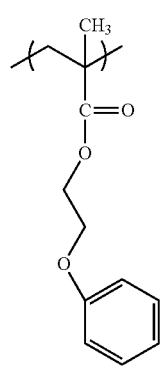(19)
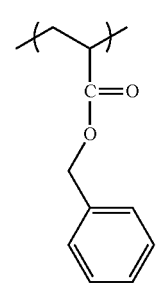(20)
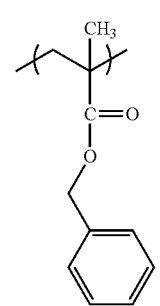(21)
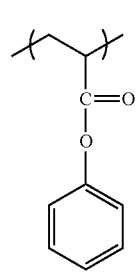(22)
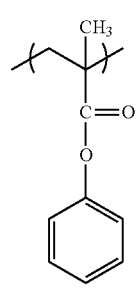(23)
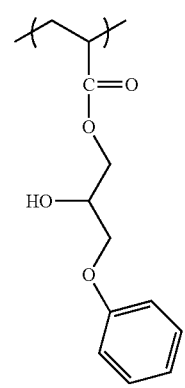(24)
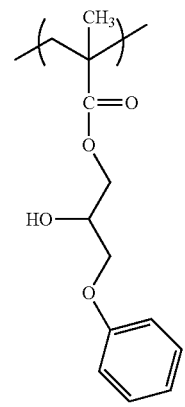(25)
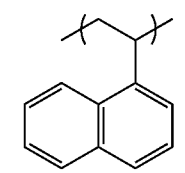(26)

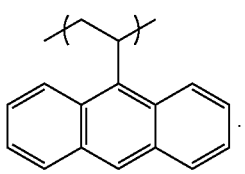
(27)

2. The optical waveguide according to claim 1 wherein the photosensitive resin composition for optical waveguide formation further comprises an epoxy compound (except for a polymer containing a repeating structural unit represented by the general formula (1), a repeating structural unit represented by the general formula (2) and/or a repeating structural unit represented by the general formula (3)).

3. The optical waveguide according to claim 1 wherein the photosensitive resin composition for optical waveguide formation further comprises an oxetane compound.

4. The optical waveguide according to claim 1 wherein the photosensitive resin composition for optical waveguide formation, further comprises at least one additive selected from the group consisting of alumina, silica, glass, silicone and titanium oxide.

5. The optical waveguide according to claim 4, wherein the additive has any one form selected from fiber, bead, liquid and powder.

6. A method for producing
the optical waveguide according to claim 1, wherein the photosensitive resin composition layer for optical waveguide formation is irradiated with actinic rays and then cured to thereby form one or both of the core layer and the cladding layer.

7. A method for producing the optical waveguide according to claim 1, comprising at least:
(1) forming a lower cladding layer constituting a lower portion of the cladding layer on a substrate;
(2) applying the resin composition for optical waveguide formation on the lower cladding layer;
(3) pre-baking the resin composition for optical waveguide formation to form a resin composition layer for optical waveguide formation;
(4) irradiating a region to be a core layer of the resin composition layer for optical waveguide formation with actinic rays through a mask;
(5) performing heating after the exposure;
(6) performing development to remove an unexposed portion of the resin composition layer for optical waveguide formation;
(7) performing post-baking to form a core layer formed of the exposed portion of the resin composition layer for optical waveguide formation; and
(8) forming an upper cladding layer constituting an upper portion of the cladding layer on the lower cladding layer having the core layer formed thereon.

8. The method for producing the optical waveguide according to claim 7, wherein, when forming one or both of the lower cladding layer and the upper cladding layer, the resin composition for optical waveguide formation having a lower refractive index than that of the core layer is irradiated with actinic rays and then cured.

\* \* \* \* \*

UNITED STATES PATENT AND TRADEMARK OFFICE
CERTIFICATE OF CORRECTION

PATENT NO. : 8,414,733 B2  
APPLICATION NO. : 12/915244  
DATED : April 9, 2013  
INVENTOR(S) : Katsumi Maeda and Kaichiro Nakano Page 1 of 1

It is certified that error appears in the above-identified patent and that said Letters Patent is hereby corrected as shown below:

In the Specification

Column 16, Line 11: Delete "226" and insert -- 2.26 --

Signed and Sealed this
Twenty-first Day of October, 2014

Michelle K. Lee
*Deputy Director of the United States Patent and Trademark Office*